INVENTOR
G. R. COURTNEY
BY J. P. Kearns
ATTORNEY

Feb. 20, 1968 G. R. COURTNEY 3,370,127

MULTIPLE ADDRESS BRIDGE CIRCUIT WITH NOISE REDUCTION CIRCUITRY

Filed Nov. 5, 1964 4 Sheets-Sheet 4

United States Patent Office 3,370,127
Patented Feb. 20, 1968

3,370,127
MULTIPLE ADDRESS BRIDGE CIRCUIT WITH NOISE REDUCTION CIRCUITRY

Galen R. Courtney, Matawan, N.J., assignor to Bell Telephone Laboratories, Incorporated, New York, N.Y., a corporation of New York Filed Nov. 5, 1964, Ser. No. 409,091
3 Claims. (Cl. 179—2)

ABSTRACT OF THE DISCLOSURE

A multiple-address bridge for a digital data communication system in which broadcast data calls from a single originating data subscriber can be made to a plurality of terminating subscribers simultaneously. Provision is made for each terminating subscriber to signal the originating subscriber on a roll-call basis as to readiness to receive the broadcast message or to confirm receipt thereof. Terminating subscribers are grouped in blocks of uniform size. A fan-in, fan-out four-wire bridge circuit intercoupling the originating subscriber with the plurality of terminating subscribers includes a normally open gating circuit for each block of terminating subscribers which is only closed responsive to a return signal from a terminating subscriber in a particular block. Noise from other blocks of terminating subscribers is thus prevented from overriding such return signal.

This invention relates to the transmission of simultaneous multiple-address data messages. In particular, a single originator is enabled to direct a high-speed data message to a large number of terminators, who are permitted to return, one at a time, confirmation or other signals to the originator.

An embodiment of this invention is intended to operate in conjunction with automatic switching systems to provide a special service for data calling telephone subscribers. It is known in two-wire telegraph systems to transmit telegraph messages to multiple addresses. It is common in these systems to transmit to a central switching office, to which the originating subscriber has access, a telegraph message which includes in its heading the multiple addresses. The message is recorded at the switching office. The switching office then retransmits the message to each addressee as soon as the proper line is idle. In this prior system control of the delivery of the message to the terminating subscriber is assumed by the switching center.

It is an object of this invention to make it feasible to place the control of the delivery of multiple address messages in the hands of the originating subscriber.

It is another object of this invention to enable each multiple addressee or terminating subscriber to return confirmation or readiness signals in sequence directly to the originating subscriber.

This invention is advantageously practiced in conjunction with a telephone switching office over conventional four-wire transmission facilities. It is contemplated that an originating subscriber desiring to place a multiple address call will dial an initial code to gain access to the multiaddress bridge of this invention. Having been connected to the multiaddress bridge, the originating subscriber dials in succession the calling numbers of all prospective multiple addressees, who are equipped with automatic send-and-receive data equipment. Each idle station is successively connected at the switching office to the multiaddress bridge. The switching office in turn signals the originating subscriber as to the busy or idle state of each called subscriber. According to this invention, any terminating subscriber, in response to a roll call from the orginating subscriber, can respond by means of prearranged data signals over a return line. After all multiple addressees have been determined to be in a state of readiness to receive a data message, the originating subscriber transmits the multiple address message simultaneously to all connected addressees.

An important problem which is encountered in connecting a plurality of called data subscribers in a telephone switching system to a single calling data subscriber is the accumulation of noise to such a level that return signals from individual called data subscribers are excessively degraded beyond the point of positive recognition. The originating subscriber's data receiver cannot distinguish legitimate return signals from the noise.

It is still another object of this invention to inhibit the noise concentration of a plurality of connected lines in a multiple address call during the transmission of return signals from individual terminating subscribers.

According to this invention, a multiple address two-way bridge is provided as a special service feature for data subscribers in a telephone switching system. The multiaddress bridge provides coupling between a single originating subscriber and a plurality of terminating subscribers through resistive couplers on a four-wire basis. A complete bridge is built up of similar modules, each serving a group of fixed maximum size.

In an illustrative embodiment a signal from the originating subscriber in the forward direction is connected through the switching system to an input port of a multiaddress module and then to two data amplifiers. Each amplifier drives a fan-out coupler which couples the signal to ten output ports. Terminating subscribers are connected through the switching system to these output ports.

Where more than nineteen terminating subscribers are to be connected, the input port of a further bridge module is connected to the first module at the twentieth output port, which is then serving as a tandem port. Additional terminating subscribers can be connected to the output ports of the further module.

In the reverse direction signals from terminating subscribers are connected through the switching equipment to further ports on fan-in couplers arranged in groups of ten. A signal on any one of these ports is coupled to an amplifier and then to an amplitude-sensitive transmission switch. Each switch, which can serve up to ten terminating subscribers, is normally open. A return signal of sufficient amplitude and duration operates the switch and is coupled to the port serving the orginating subscriber. Since only one terminating subscriber by prearrangement is permitted to return a signal as a given time, the return signal never has to compete with noise from more than ten terminating subscribers. The noise from all other groups of terminating subscribers is blocked from the return path to the originating subscriber.

Resistive terminations are provided for all output ports to maintain a balanced bridge load. As each terminating subscriber is connected to the bridge, the associated terminating resistor is removed from the circuit under the control of the central switching office.

A better understanding of the objects, features and advantages of this invention will be obtained from the following detailed description and the drawing in which.

The multiaddress bridge of this invention is intended for use in the environment of a four-wire automatic switching center of the type now used at toll switching centers under the nationwide dialing plan. Multiaddress calls of the broadcast type are to be placed on a partial conference basis through this type of switching center by the use of high-speed, automatic, send-and-receive data equipment located on customer premises. The forward paths of the bridge pass data signals at 1200 or 2400 bits per second, for example, using known modulation or multifrequency techniques and bifrequency, 50 millisecond control signals. The reverse paths of the bridge are adapted to handle any type of signal having a continuous carrier component, such as, bifrequency, frequency-modulation or phase-modulation signals. Thus, two-way signals can be accommodated, although not on a full duplex basis. Nevertheless, four-wire transmission facilities are assumed.

A bridge, for the purposes of this specification, may be defined as a circuit for coupling between a single input line and a plurality of output lines simultaneously without causing mutual interference among any of the output lines.

Figure 1:
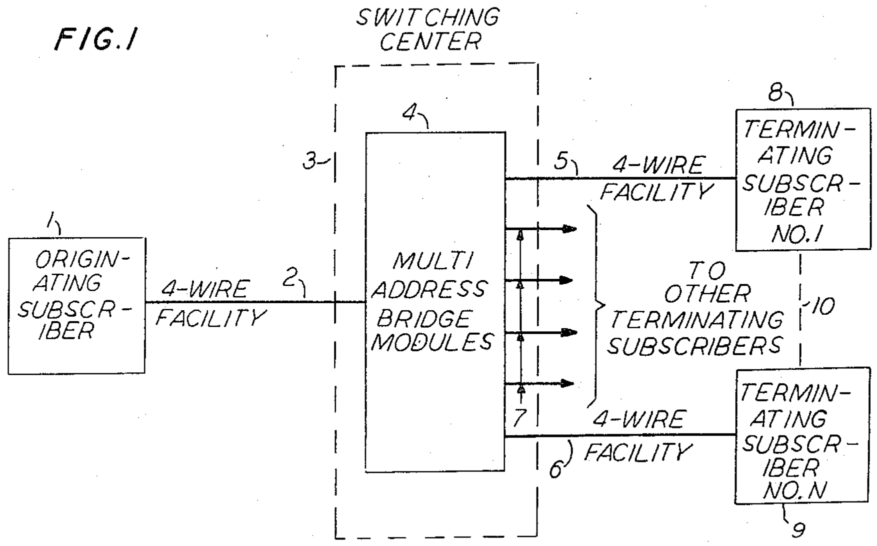
FIG. 1 is a line diagram of the signal paths through the multiaddress bridge of this invention in a central switching office environment.

FIG. 1 illustrates in an overall aspect bridging connections between a single originating subscriber 1 and a plurality of terminating subscribers including those in blocks 8 and 9. All subscribers have conventional access to a telephone switching center 3 over four-wire facilities, such as lines 2, 5 and 6. Facilities 7 lead to additional terminating subscribers indicated generally by broken line 10. Within the switching center 3 is located the special facility of this invention—multiaddress bridge 4. Through switching operations of a conventional nature the appearances of the originating and terminating subscribers are linked to the input and output connections of multiaddress bridge 4 in preparation for the transmission of a broadcast-type data call.

Figure 2:
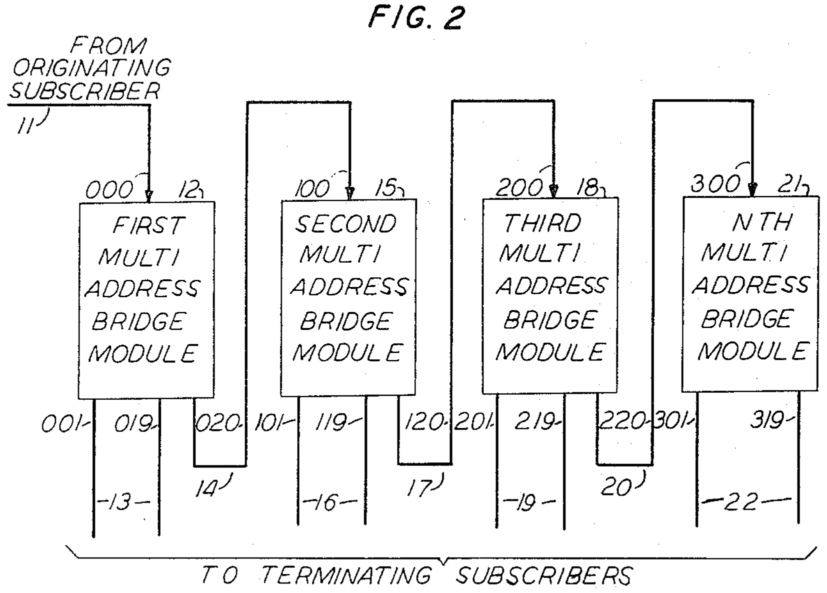
FIG. 2 is a line diagram showing connections between multiaddress bridge modules of this invention.

In accordance with the present invention the multiaddress bridge 4 is built up of uniform modules as shown in FIG. 2. Four modules 12, 15, 18 and 21 are shown connected in tandem. Each module, for convenience in design, has 21 ports or termination sets. Each single input port is designated "00." Multiple output ports are designated "01" through "20." Each bridge module is designated by a hundreds digit, in addition. Output ports "01" through "19," prefixed with a module digit and generally designated 13, 16, 19 and 22, are connected through the switching network to terminating subscribers. Output ports "20" are tandem ports which serve to connect the output of one module to the input of another over a lead such as 14, 17 or 20. The input port "000" of the first module 12 is connectable through the switching network over lead 11 to the originating subscriber. Thus, terminating subscribers can be added on in multiples of nineteen. Alternatively, each module in a bridge can be used independently for different originating subscribers on calls directed to nineteen or fewer recipients. The total number of modules connectable in tandem is limited only by signal degradatioin tolerable by the last-connected terminating subscribers.

Figure 3:
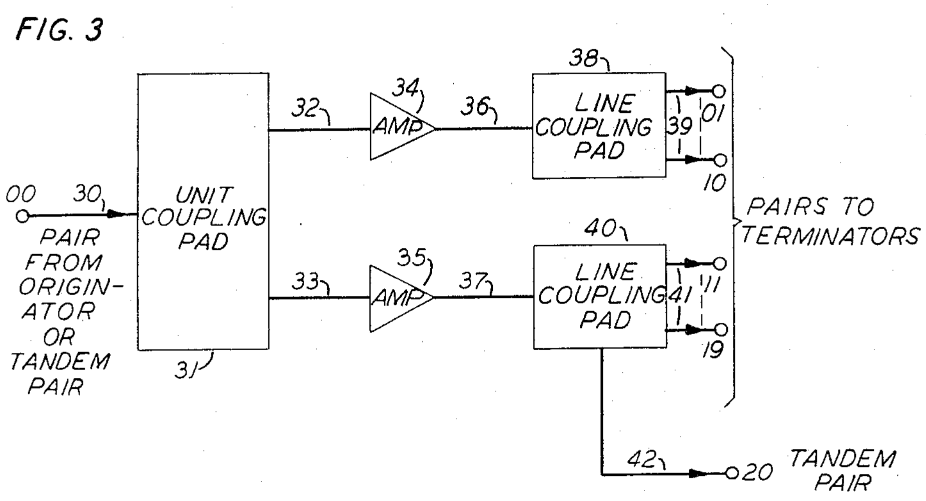
FIG. 3 is a line diagram of the forward signaling path through the multiaddress bridge of this invention.
Figure 4:
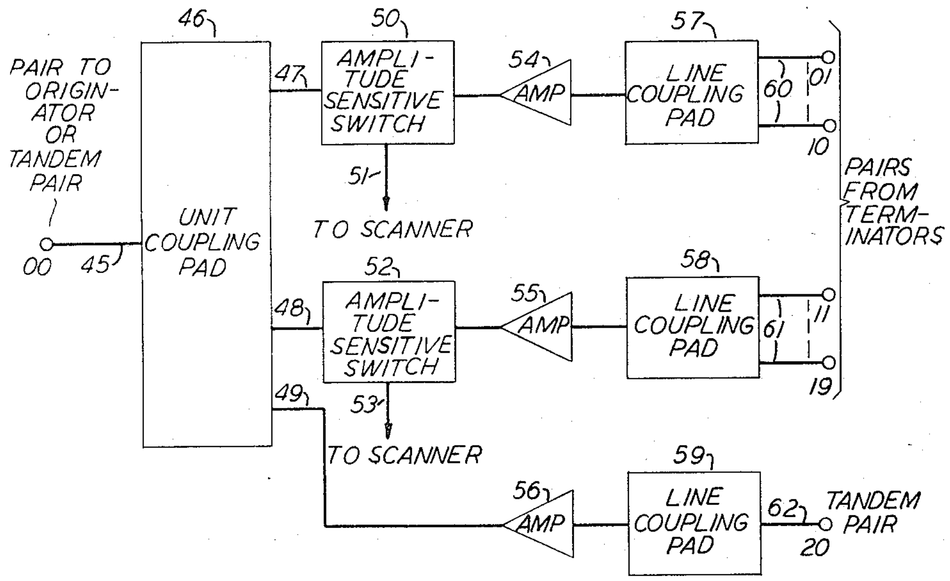
FIG. 4 is a line diagram of the reverse signaling path through the multiaddress bridge of this invention.

Single-line block diagrams of the forward and reverse paths through a bridge module are shown in FIGS. 3 and 4. In the forward path shown in FIG. 3, a signal from the originating subscriber arrives over line 30 at input port "00." Input port "00" connects to unit coupling pad 31, a resistive network. Two outputs are obtained from pad 31 on lines 32 and 33. Each of these lines drives an amplifier, 34 or 35 as indicated, to compensate for the loss through the coupling pad. The outputs of amplifiers 34 and 35 on leads 36 and 37 drive line coupling pads 38 and 40, also resistive networks. These pads each fan out to ten output ports generally designated 39 and 41. In addition, a twentieth output port on lead 42 is used for a tandem connection to a further module. The pads provide impedance matching and isolation among the several outputs.

In the reverse path shown in FIG. 4 signals from terminating subscribers are applied to input ports "01" to "19." A first group of ten subscribers is arranged as generally indicated as 60 to terminate at line coupling pad 57. A second group of nine subscribers is arranged as generally indicated by 61 to terminate at line coupling pad 58. The respective groups fan in to drive amplifiers 54 and 55. Up to this point FIG. 4 is substantially the inverse of FIG. 3. The outputs of respective amplifiers 54 and 55 are not, however, directly coupled to unit coupling pad 46. Rather these outputs are applied to amplitude-sensitive switches 50 and 52. Normally the paths through these switches are open to inhibit the noise on terminating subscriber lines from being concentrated on the line to the originating subscriber. These switches have a threshold level of operation set somewhat above the additive noise level from ten terminating subscriber lines. When a signal from any individual terminating subscriber exceeds the established threshold level, the switch operates automatically to close a path to unit coupling pad 46 over lead 47 or 48. By prearrangement with the terminating subscribers, only one is allowed to transmit a signal at any given time. In practice this return signaling might follow queries by the originating subscriber after all terminating subscribers have been dialed up as to their readines to receive data. Signals may be provided from each switch 50 and 52 on respective leads 51 and 53 to scanning or monitoring equipment in the switching office to indicate the state of the switch at any given time.

Tandem port "20" at lead 62 has its own line coupling pad 59 and is coupled to unit coupling pad 46 through amplifier 56 and lead 49. No amplitude-sensitive switch is necessary for the tandem connection because any signal appearing here would have traversed an amplitude-sensitive switch in another multiaddress module.

Leads 47, 48 and 49 are fanned in through unit coupling pad 46 to output port "00" on lead 45. Connections to the originating subscriber are made through the switching center at output port "00."

Figure 5:
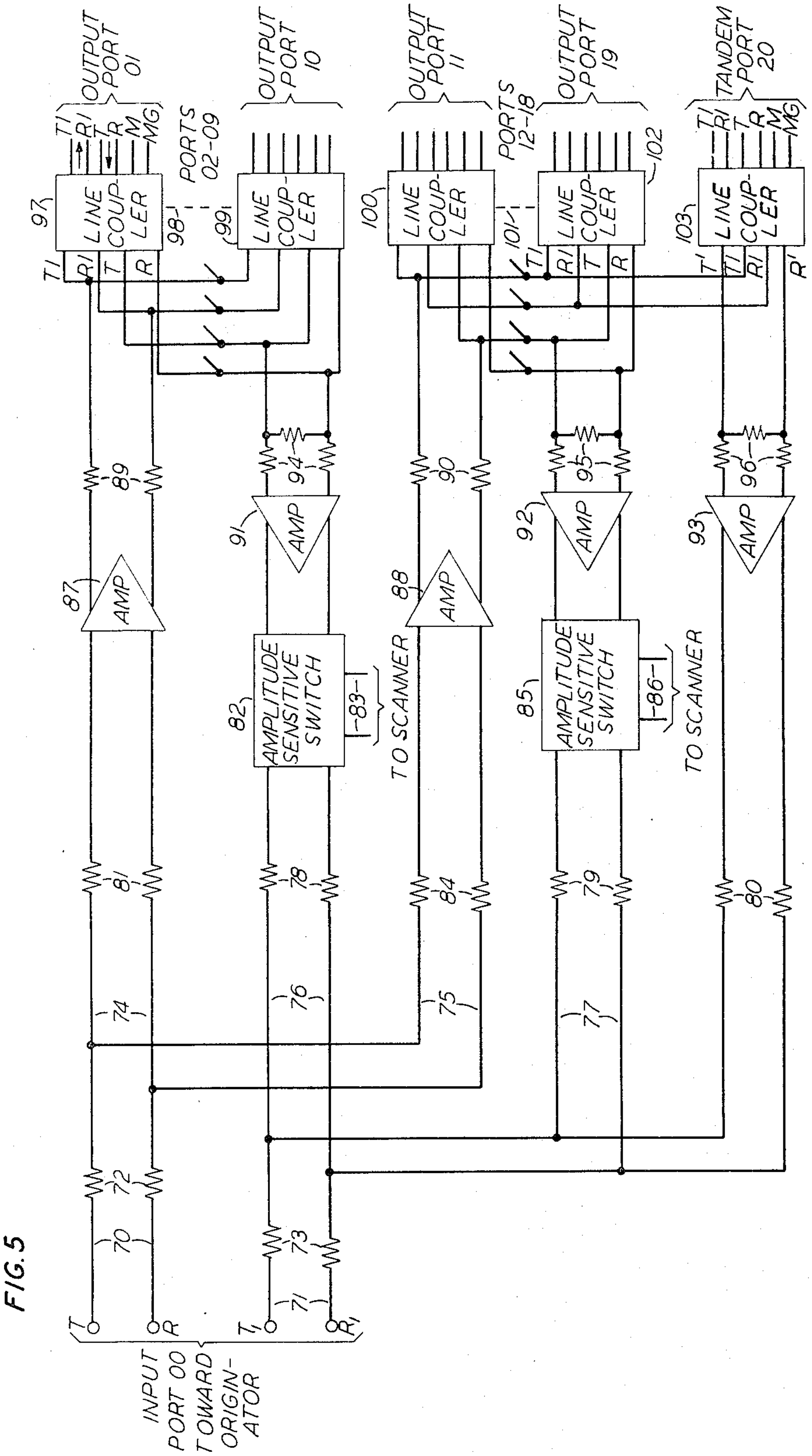
FIG. 5 is a more detailed schematic diagram of the circuit of the multiaddress bridge of this invention.

FIG. 5 is a two-line expansion and combination of FIGS. 3 and 4 and shows a complete multiaddress bridge module according to this invention. A four-wire input port "00" is multiplied to nineteen four-wire subscriber output ports number "01" through "19" and one tandem output port "20." The input port "00" includes a forward tip and ring pair 70 and a reverse tip and ring pair 71.

The forward pair 70 after resistive pad 72 is split between lead pairs 74 and 75 to the inputs of amplifiers 87 and 88 through further resistive pads 81 and 84. The output of amplifier 87 through resistive pad 89 is connected to the T1–R1 input leads of ten line couplers, such as 97 and 99, the other couplers being indicated generally by broken line 98. Similarly, the output of amplifier 88 through resistive pad 90 is connected to the T1–R1 input leads of nine line couplers, such as 100 and 102, the other couplers being indicated generally by broken line 101. The output of amplifier 88 is also connected to the T1 and R1 leads of tandem line coupler 103.

The reverse pair 71 after resistive pad 73 is split between lead pairs 76 and 77 to the outputs of amplitude-sensitive switches 82 and 85 through respective resistive pads 78 and 79. Lead pair 77 is further split at the junction of pads 79 and 80 to connect to the output of amplifier 93. Each amplitude-sensitive switch 82 or 85 is driven by an amplifier, such as 91 or 92. The inputs of these amplifiers are isolated by impedance matching pads 94 and 95 from the T and R leads of the line couplers. The T and R leads from ten line couplers, such as 97 and 99, are multiplied to pad 94. The T and R leads from nine line couplers, such as 100 and 102, are multipled to pad 95. The reverse pair from tandem line coupler 103, designated T′ and R′ do not connect to an amplitude-sensitive switch, but rather through impedance-matching pad 96 to the input of amplifier 93.

Amplifiers 87, 88, 91, 92, and 93 make up for losses in the bridge in a conventional manner.

Each line coupler has six external connections constituting the respective output ports. A T1–R1 lead pair is connected in the outward direction to a terminating subscriber. A T–R lead pair is connected in the inward direction to each terminating subscriber. An M–MG pair of control leads connects to the switching equipment in the central office and operates a relay in each line coupler to remove a resistive termination across the respective T1–R1 and T–R lead pairs as each terminating subscriber is connected to an output port. The terminations maintain a constant load on the input port regardless of the number of connected terminating subscribers.

Amplitude-sensitive switches 82 and 85 are supplied with scanning or minitoring outputs to the central office on respective lead pairs 83 and 86 as shown.

Figure 6:
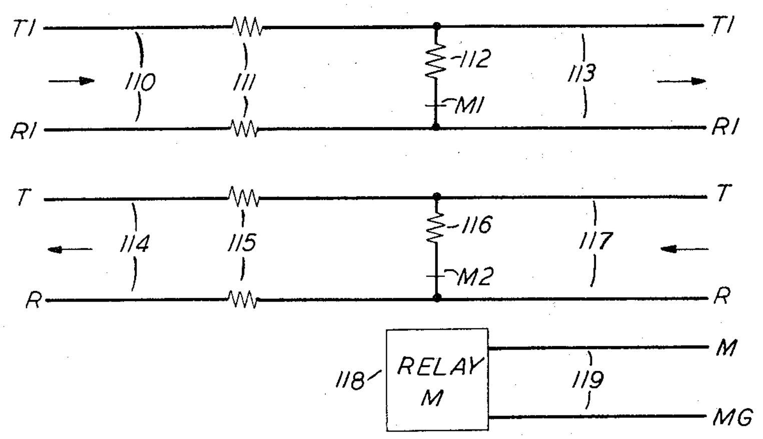
FIG. 6 is a circuit diagram of an output port for the multiaddress bridge of this invention.

The internal arrangements for each line coupler of FIG. 5 are shown in FIG. 6. There are two independent lead pairs in each line coupler. The T1–R1 pair provides a path in the forward direction from originating to terminating subscriber. Similarly, the T–R pair provides a path in the reverse direction between the originating and a terminating subscriber. The forward pair includes a resistive pad 111 and a termination 112 between input side 110 and output side 113. The reverse pair includes a resistive pad 115 and a termination 116 between output side 114 and input side 117. A relay M, also designated 118, is provided for each port and has external connections for its coil on leads 119. There are break contacts, such as M1 and M2, on relay M in series with the termination resistors 112 and 116 in the respective forward and reverse paths through each line coupler.

Figure 7:
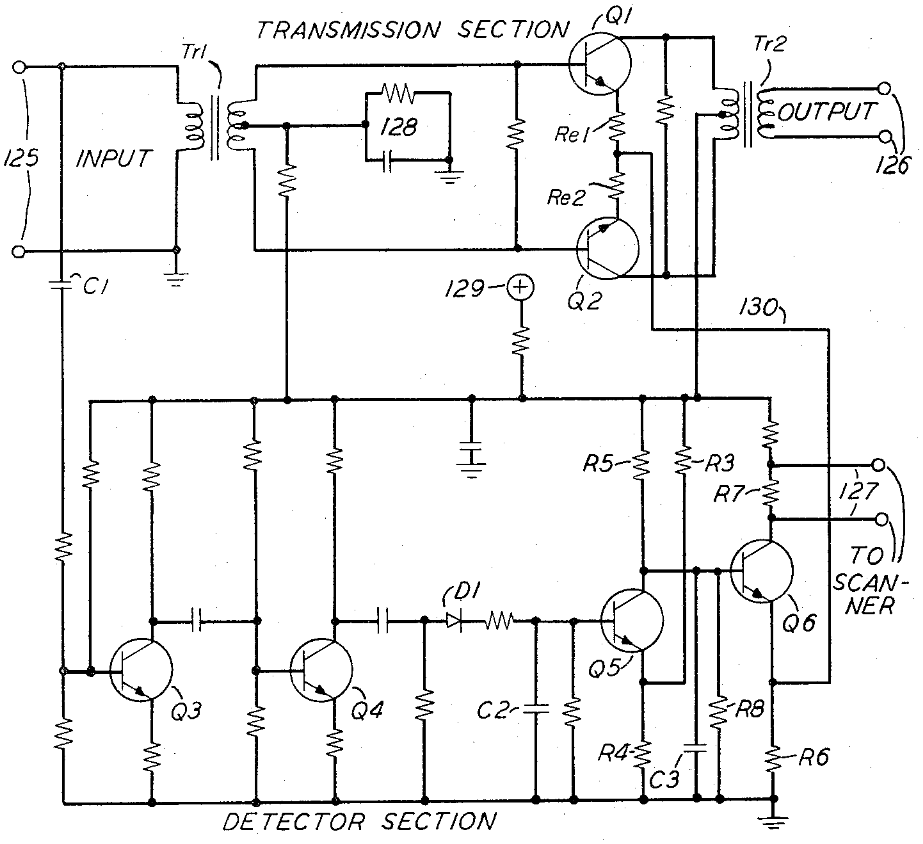
FIG. 7 is a circuit diagram of an illustrative embodiment of an amplitude-sensitive transmission switch useful in the practice of this invention.

A specific embodiment of a workable circuit for an amplitude-sensitive transmission switch, useful in the practice of this invention, is shown in FIG. 7. The switch is used, as previously stated, in a multiaddress bridge to discriminate between a proper-amplitude signal and noise out of a group of ten lines. The accumulated noise from a group of lines of this size is generally of insufficient amplitude or duration to operate the switch. However, legitimate signaling tones or sequences having a constant-level carrier on any one line, in proper sequence, are sufficient to exceed the threshold of detection and allow the signaling tone to be transmitted to the originating subscriber.

The permissible signal level on a cable pair is limited by crosstalk considerations. This level would be too low to overcome the accumulated noise from large numbers of connected subscribers. Since it is not feasible to increase the signal level, the effective noise level is reduced, according to this invention, by dividing the terminating subscribers into groups.

The transmission switch of FIG. 7 is logically separable into two sections. The transmission section comprises input and output transformers T1 and T2 and transmission gating transistors Q1 and Q2 with associated components. The detection section comprises an input amplifier including transistors Q3 and Q4, a rectifier diode D1, a storage capacitor C2, direct-current amplifier transistor Q5 and control transistor Q6.

The transmission section is an unbalanced to balanced converter interconnecting input terminals 125 and output terminals 126. Noise and signaling tone from the returning two-wire pairs of up to ten terminating subscribers are incident at input terminals 125. Output terminals 126 deliver signaling tones only to the inward originating subscriber's pair. Transistors Q1 and Q2 act together in a balanced arrangement as a transmission switch to close paths between the center-tapped secondary winding of input transformer *Tr*1 and the center-tapped primary winding of output transformer *Tr*2. Transistors Q1 and Q2 have their base electrodes connected to the secondary winding terminals of transformer *Tr*1 and their collector electrodes connected to the primary winding terminals of transformer *Tr*2. Power is furnished to the collector electrodes from power source 129 through the center tap of transformer *Tr*2 in an obvious manner. Forward bias for the base electrodes of transistors Q1 and Q2 is derived across R–C circuit 128 from power source 129. The emitter electrodes of transistors Q1 and Q2 are connected in common through resistors R*e*1 and R*e*2 to the emitter of control transistor Q6 in the detector section over lead 130. In the absence of a legitimate signaling tone the emitter of transistor Q6 is at a relatively high potential and transistors Q1 and Q2 are cut off. In operation transistors Q1 and Q2 supply just enough gain to overcome the inherent losses of the transmission switch.

The transmission section places no restriction on the type of return signal permissible, other than that a constant level component be present which exceeds the average expected noise level.

The detector section monitors the signal and noise at the input terminals 125 and is connected thereto through capacitor C1. Transistors Q3 and Q4 form conventional capacitor-coupled A–C amplifiers with common emitter connections. The amplified signal at the collector of transistor Q4 is detected by rectification in diode D1. A voltage builds up on capacitor C2 in a well known manner proportional to the peak amplitude of the rectified output of diode D1. The associated resistors provide a smoothing action.

The transistor Q5 is normally nonconducting due to the small positive fixed bias at its emitter supplied by the voltage divider including resistors R3 and R4 connected to the supply source 129. This bias establishes the threshold of conduction for transistor Q5 and hence the detection level of the transmission switch. This threshold is chosen to exceed the noise level from up to ten terminating subscriber lines. There is also a small delay, due principally to the presence of capacitor C3 in the collector circuit of transistor Q5, in the operation of the detector section and this delay serves as additional protection against operation on noise impulses. A legitimate signaling tone easily exceeds both amplitude and delay barriers and causes transistor Q5 to conduct. The collector potential then drops to a low level.

Control transistor Q6 is normally conducting because its base electrode is returned to supply source 129 through resistor R5 in the collector circuit of transistor Q5. At this time the potential at its emitter and across resistor R6 is also high. This potential back biases the emitters of transistors Q1 and Q2 in the transmission section and thereby holds the transmission path open. When, however, transistor Q5 is thrown into conduction upon detection of signal-tone, its collector potential falls in a time determined by capacitor C3 and cuts off transistor Q6. The emitter potential of the latter then falls sufficiently to bias the transmission section into the conducting state. At the end of the signal interval transistor Q6 again turns on as soon as capacitor C3 can discharge through its associated resistor R8.

A signal to a scanning device in the central office switching equipment is advantageously provided on leads 127 to indicate that a terminating subscriber of a multipled group is returning a signal. These leads are connected across resistor R7 in the collector circuit of transistor Q6. There is no voltage across these leads when transistor Q6 is cut off.

While this invention has been described in terms of a specific illustrative embodiment, it will be apparent to those skilled in the art that numerous modifications are possible within the scope of the appended claims.

I claim:

1. In combination with a multiaddress bridge for intercoupling a single message originator to a plurality of message receivers and for returning confirmation signals from each message receiver to the message originator, means concentrating the return signaling paths from said message receivers in groups of predetermined size, an amplitude-sensitive transmission switch in series with each said group normally preventing noise disturbances from reaching said message originator, a transmission section in said switch capable of providing a through connection from input to output thereof, a detection section normally holding said transmission section open when noise only is incident on said switch, and means establishing a threshold level of operation in said detection section above the combined noise level of the associated group of message receivers, a confirmation signal from one of the associated message receivers exceeding said threshold level causing said detection section to enable said transmission section.

2. The combination defined in claim 1 in which said transmission section comprises an input transformer, an output transformer, a pair of transistors with base electrodes in circuit with said input transformer and collector electrodes in circuit with said output transformer.

fixed means applying a forward bias to said base electrode and a reverse bias to said collector electrodes, and means coupling the emitter electrodes of said transistors in common to said detector section.

3. The combination defined in claim 1 in which said detector section comprises means amplifying confirmation signals from a message receiver, means rectifying the amplified signals from said amplifying means, a firist transistor switch, fixed biasing means applied to said first transistor switch to hold it nonconducting, means coupling said first transistor switch to said rectifying means, a confirmation signal from said rectifying means exceeding the level of said fixed biasing means, a second transistor switch controlled by said first transistor switch to assume a conduction state opposite to that of said first transistor switch, and means coupling the emitter electrode of said second transistor switch to enable said transmission section when said second transistor switch is nonconducting.

References Cited

UNITED STATES PATENTS

| | | | |
|---|---|---|---|
| 2,341,027 | 2/1944 | Edwards | 179—1 |
| 3,166,678 | 1/1965 | Fleshman et al. | 328—150 X |
| 3,210,476 | 10/1965 | Shaer | 179—18.01 |
| 3,301,962 | 1/1967 | McKelvey et al. | 179—18.01 |

ROBERT L. GRIFFIN, *Primary Examiner.*

JOHN W. CALDWELL, *Examiner.*

J. T. STRATMAN, *Assistant Examiner.*